H. A. COOK.
SUBSOIL WORKING MEANS FOR TRACTOR WHEELS.
APPLICATION FILED JAN. 23, 1920.

1,362,527. Patented Dec. 14, 1920.

Witnesses
Benj. Kahn

Inventor
H. A. Cook
By Victor J. Evans
Attorney

UNITED STATES PATENT OFFICE.

HARRY A. COOK, OF DIXON, NEBRASKA, ASSIGNOR OF ONE-FOURTH TO JOHN J. MANZ, OF DIXON, NEBRASKA.

SUBSOIL-WORKING MEANS FOR TRACTOR-WHEELS.

1,362,527. Specification of Letters Patent. Patented Dec. 14, 1920.

Application filed January 23, 1920. Serial No. 353,403.

*To all whom it may concern:*

Be it known that I, HARRY A. COOK, a citizen of the United States, residing at Dixon, in the county of Dixon and State of Nebraska, have invented new and useful Improvements in Subsoil-Working Means for Tractor-Wheels, of which the following is a specification.

The object of my present invention is the provision of means for use on a tractor wheel that runs in the furrow in advance of a plow, of sub-soil attachments—*i. e.*, devices adapted to tear up or open the subsoil below the depth at which the plow works, this with a view to loosening the earth to a considerable depth at intervals, so as to adapt the soil for the penetration of moisture and to enable grain roots to secure a firm hold.

To the attainment of the foregoing, the invention consists in the improvement as hereinafter described and definitely claimed.

In the accompanying drawings, hereby made a part hereof:—

Similar numerals of reference designate corresponding parts in all of the views of the drawings.

Figure 1:
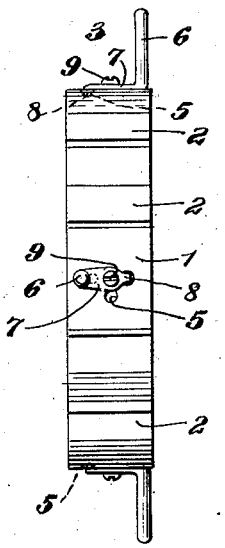
Figure 1 is a side elevation of a tractor wheel equipped with my invention.
Figure 2:
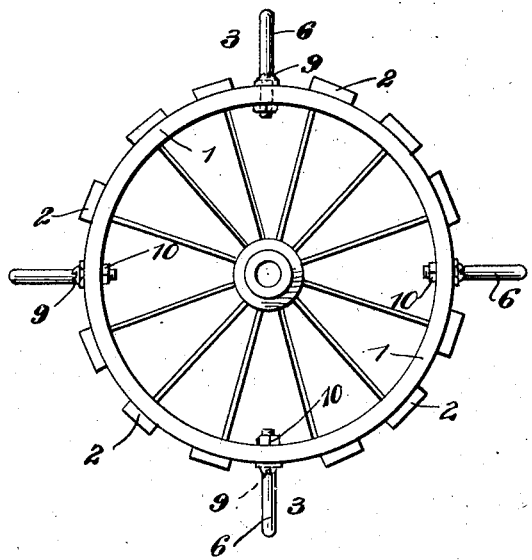
Fig. 2 is an elevation of the wheel taken at right angles to Fig. 1.
Figures 3, 4, 5:
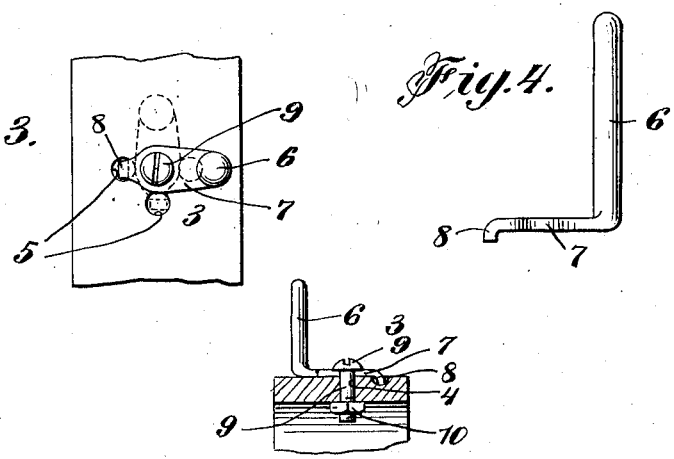
Fig. 3 is a detail view showing a portion of the rim of the wheel as equipped for the adjustable though positive fixing of one of my novel subsoil devices thereto.
Fig. 4 is a detail view of one of the subsoil devices removed from the rim.
Fig. 5 is a detail section taken through one of the indentures in the periphery of the rim.

The tractor wheel rim 1 illustrated is, shown as provided at intervals with lugs 2, designed to increase the tractive capacity of the wheel. These tractive devices are not, however, of the essence of my invention, and therefore the same may be of any approved description without affecting the invention as claimed.

In accordance with my invention, the rim 1 is provided with a plurality of sub-soil devices 3, detachably and adjustably connected thereto, and the rim is also provided in the preferred embodiment of the invention, with radial apertures 4, and peripheral indentures 5, there being three of the said indentures 5 grouped about each radial aperture 4. Each of the sub-soil devices 3 includes a finger-like shank 6 to penetrate the soil to a considerable distance with a view to tearing the sub-soil, and a base 7 to which the shank 6 is angularly disposed. In this connection it is to be understood that the shanks 6 may be set at any angle desired to their bases. In the preferred embodiment of my invention, each base 7 is provided at its end remote from its complementary shank 6, with a projection 8, designed to be disposed in one of the indentures 5. Extending through the apertures 4 of the rim 1, are bolts 9 which also extend through the bases 7 of the sub-soil devices to connect said bases to the rim, and are equipped at the inner side of the rim with nuts 10.

The shanks 6 of the sub-soiling devices may be of different lengths, according to the character and condition of the soil, but in all cases the said shanks 6 are sufficiently long to extend several inches below the surface. The said shanks 6 are adapted to loosen the sub-soil at intervals at from one to two feet. It is also to be understood that the shanks 6 may be of any preferred shape in cross-section.

Manifestly by loosening the bolts 9, the projections 8 of the shanks 6 may be lifted out of the indentures 5, and then the shanks may be adjusted toward the center or other side of the tractor wheel, and then by seating the projections 8 in other indentures 5, and tightening the nuts 10, the shanks 6 may be again fixed to the rim of the wheel. From this it follows that the shanks 6 may, when deemed expedient, be arranged in staggered relation, so that one-half of the sub-soiling shanks 6 will run along the edge of each furrow.

The construction described constitutes the preferred embodiment of my invention, but I do not desire to be understood as confining myself to the said specific construction, inasmuch as various changes in construction may be made without involving departure from the scope of my invention as defined by my appended claims.

Having described my invention, what I claim and desire to secure by Letters-Patent, is:—

1. A tractor wheel having upon the periphery of its rim a plurality of sub-soiling devices having comparatively long finger-like sub-soiling shanks that extend generally in a radial direction from the periphery; the said sub-soiling devices being adjustably connected with the rim and constructed and arranged to position their shanks in different positions relatively to the longitudinal center of the rim.

2. The combination in a tractor wheel for the purpose described, of a rim having a radial aperture and also having indentures in its periphery and grouped about said aperture; a sub-soiling device having a finger-like shank generally disposed radially to the rim and also having a base opposed to the rim periphery and an inward projection on the base and adapted to be seated in one of the indentures, and a bolt arranged between the shank and projection and extending through the rim aperture and connecting the said base and the rim.

In testimony whereof I affix my signature.

HARRY A. COOK.